Figure 3:
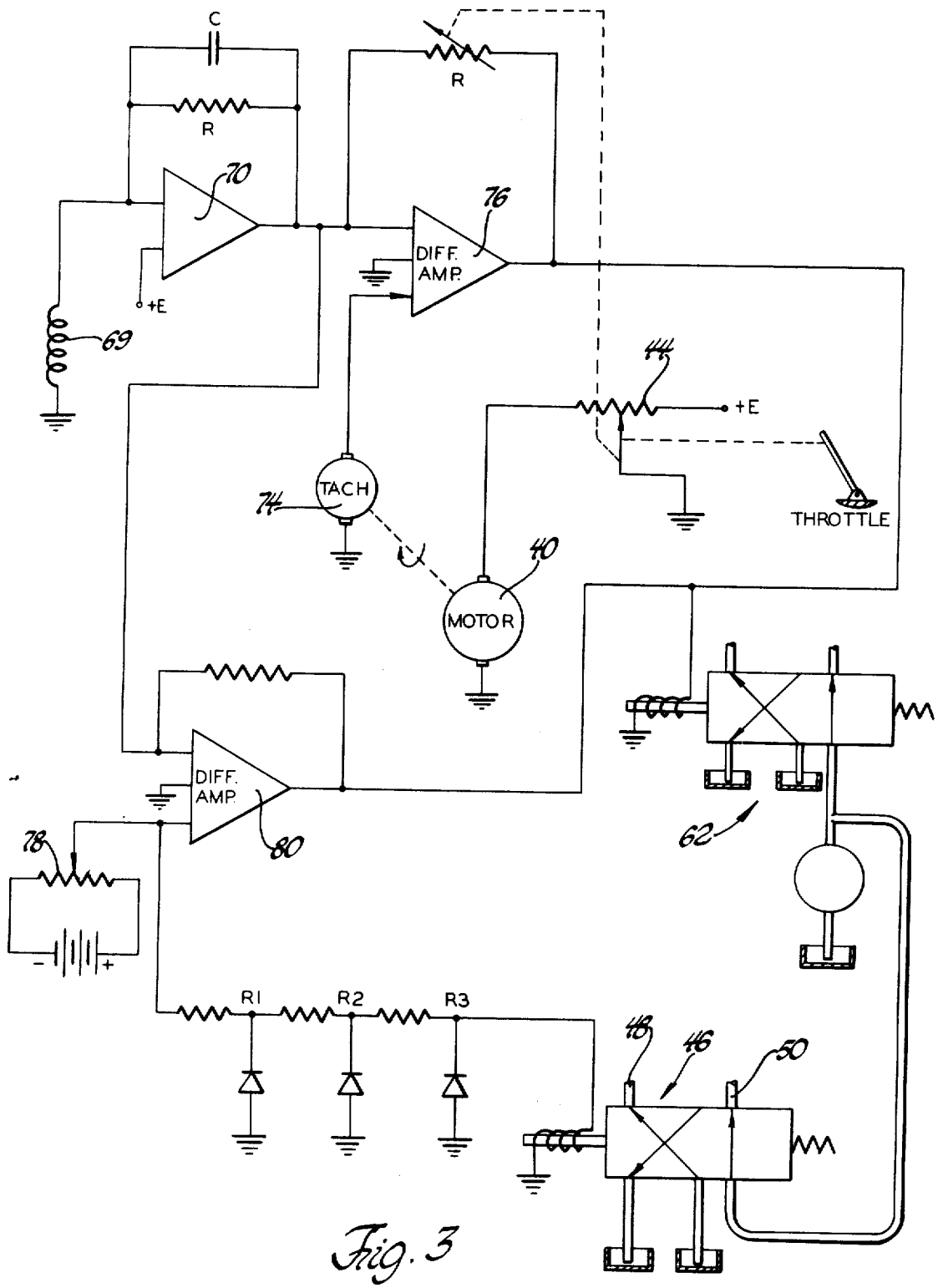

United States Patent

Sobey et al.

[15] 3,675,583
[45] July 11, 1972

[54] SPEED AND SLIP CONTROLLED TRACTION DRIVE

[72] Inventors: Albert J. Sobey, Bloomfield Hills; Richard H. Donlon, Troy, both of Mich.

[73] Assignee: Transportation Technology, Inc., Madison Heights, Mich.

[22] Filed: Oct. 29, 1969

[21] Appl. No.: 872,021

[52] U.S. Cl. ............... 104/23 FS, 104/147 R, 104/243, 104/247, 105/30, 105/61, 105/76, 105/215 R, 290/45, 315/77, 318/52
[51] Int. Cl. .................. B60v 3/04, B61c 15/08, B61f 9/00
[58] Field of Search ............... 104/23 FS, 147 R, 243, 247; 105/30, 61, 76, 215 R; 290/45; 315/77, 79, 80; 318/52

[56] References Cited

UNITED STATES PATENTS

| | | | |
|---|---|---|---|
| 1,325,870 | 12/1919 | Hanscotte | 105/30 |
| 3,164,103 | 1/1965 | Lathers et al. | 105/30 X |
| 3,251,312 | 5/1966 | Livingston | 105/61 |

*Primary Examiner*—Arthur L. La Point
*Assistant Examiner*—Howard Beltran
*Attorney*—McGlynn, Reising, Milton & Ethington

[57] ABSTRACT

A controlled traction vehicle gripping drive and brake system including a vehicle supported relative to a roadway having a fixed central vertical rail, a pair of drive-brake wheels mounted on the vehicle for rotation about vertical axes, and hydraulic control means for varying the caliper loading between the wheels and the faces of the rail to control wheel slip under vehicle cruise, acceleration, and deceleration conditions.

13 Claims, 3 Drawing Figures

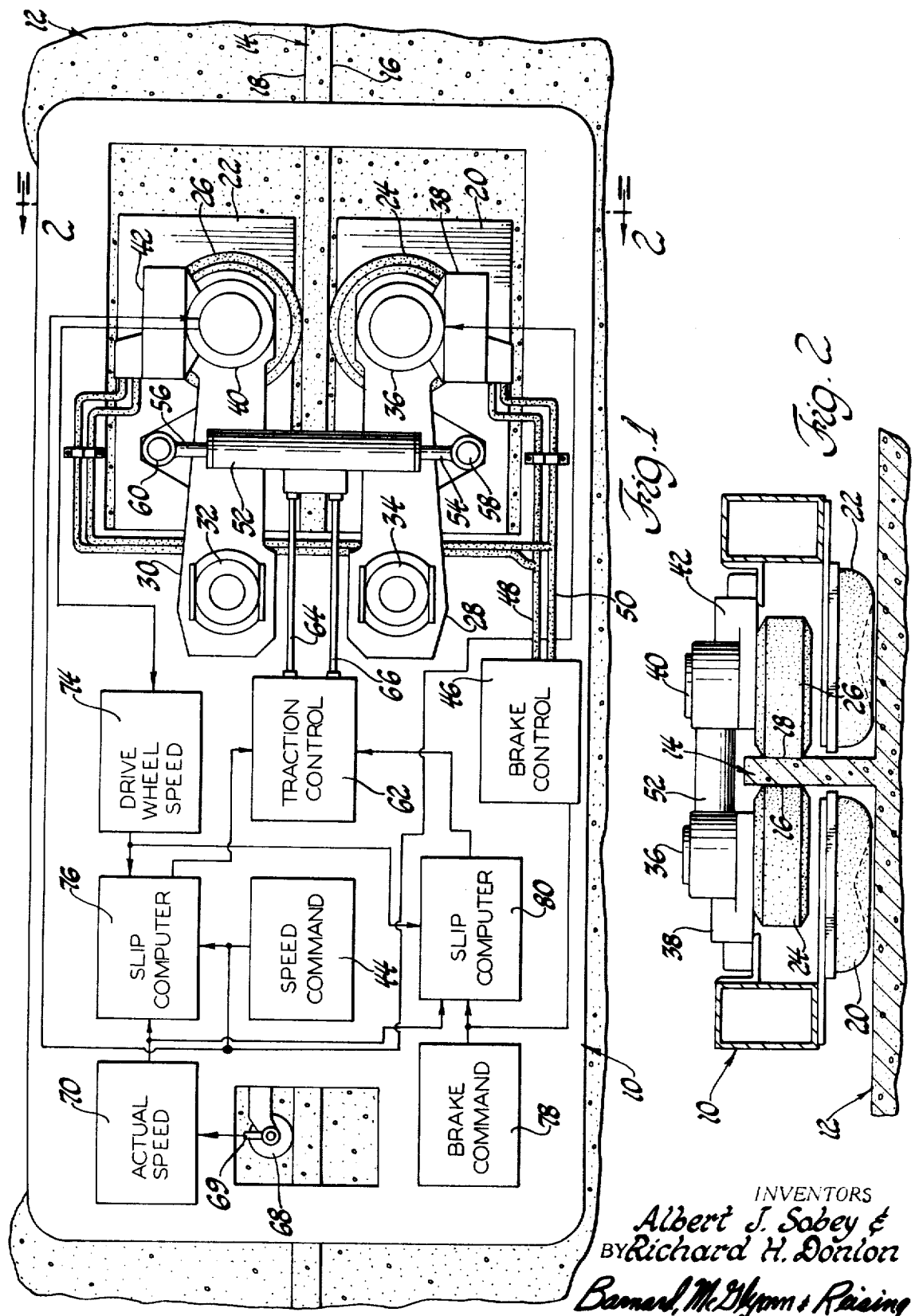

SPEED AND SLIP CONTROLLED TRACTION DRIVE

This invention relates to vehicular traction systems and more particularly to a vehicular traction system in which the slip between a controlled wheel and a traction surface is varied in accordance with the operating mode of the vehicle.

It is well known that the traction between a wheel and a traction surface affects the acceleration and braking capabilities of that wheel. A vehicle can accelerate or decelerate most rapidly if slip between the controlled wheel and the traction surface is controlled. Accordingly, systems have been developed for controlling power application and brake force to achieve an optimum acceleration or deceleration effect by controlling the degree of slip between the wheel and the traction surface.

The present invention provides traction control and optimization not only by monitoring wheel slip but also by controlling the load force or pressure between the drive wheel and a traction surface so as to optimize the slip for best vehicular performance in a selected operating mode. In general, this is accomplished by provision of a fixed traction surface which is coextensive with a roadway, a drive wheel on the vehicle which engages the traction surface, and control means such as an hydraulic actuator for selectively varying the load or pressure applied to the traction surface by the wheel. The invention further includes means for deriving a control signal which is related to the slip between the wheel and the traction surface, this signal being applied to the control means to vary the pressure or load and, thus, to control the slip.

The invention, according to a further feature thereof, greatly minimizes wear and destructive heating of the driven wheel or wheels by relieving the driven wheel or wheels from the burden imposed by the weight of the vehicle. In general, this is accomplished by the provision of separate running gear which supports the vehicle relative to the roadway and permits the driven wheel or wheels to normally run under only the variable load which is imposed by the control means, previously described. Moreover, this provision permits the traction surface or surfaces to be other than on the horizontal surface of the roadway, thus, permitting greater flexibility in roadway and vehicle design.

In a preferred embodiment, the vehicle, which is supported by suitable running gear relative to a horizontal roadway surface, is equipped with a pair of drive wheels which are disposed for rotation about spaced vertical axis and which engage complementally opposite surfaces of a vertical rail. The control means in the form of an hydraulic actuator is connected between pivotally mounted caliper arms which support the wheels so as to permit the wheels to be variably loaded against the traction surfaces to control the slip between the wheels and the traction surfaces in accordance with a predetermined program. Either or both of the wheels may be driven with separate motors or a single motor through a gear train and either or both wheels may be provided with suitable brakes.

The invention will be best understood from a reading of the following specification which describes an illustrative embodiment of the invention and is to be taken with the accompanying drawings of which:

FIG. 1 is a plan view in block diagram detail of a specific embodiment of the invention, FIG. 2 is a sectional view taken along the line 2—2 of FIG. 1 illustrating the vertical arrangement of elements in the specific embodiment, and FIG. 3 is a schematic drawing of the control system illustrated in block diagram in FIG. 1.

Referring nOw to FIGS. 1 and 2, the specific embodiment of the invention is shown to include an automotive vehicle having a chassis 10 which is adapted to travel a roadway 12 having a generally flat, horizontal surface profile. Fixed to the roadway 12 and coextensive with the centerline thereof is a raised, vertical rail 14 having complementally opposite, vertical traction surfaces 16 and 18. The roadway 12 and rail 14 may be contructed of reinforced cement or steel so as to provide the necessary load-bearing characteristics and durability. The vehicle represented by the chassis 10 is supported relative to the roadway 12 by running gear which in the illustrated embodiment includes a pair of low-pressure air pads 20 and 22 laterally spaced about the rail 14 and extending longitudinally of the vehicle. The design, construction, and operation of such air pads is well known to those skilled in the art and no detailed explaination will be given. It is to be understood that the air pads 20 and 22 are representative of a suitable running gear but that various other types of running gear may be employed with the invention to support the vehicle relative to the roadway 12.

Mounted on the vehicle for rotation about spaced vertical axes, as best shown in FIG. 2, are wheels 24 and 26 which engage the complementally opposite traction surfaces 16 and 18 of the rail 14. While at the present time rubber tired wheels are preferred, it is to be understood that other devices such as track laying means may be substituted for the wheels 24 and 26 without departing from the present invention. Wheels 24 and 26 are rotationally mounted on heavy, rigid caliper arms 28 and 30 which are pivotally supported on the chassis 10 by pivots 32 and 34, respectively.

In the illustrated embodiment, the traction wheel 24 is driven at selected speeds by a motor unit 36 which is mounted on the caliper arm 28 and subject to speed control by an operator. In addition, wheel 24 is provided with an hydraulic brake unit 38 for applying a selectively controlled braking force to the wheel. Similarly, traction wheel 26 is provided with a motor unit 40 mounted on the caliper arm 30 and a brake unit 42 which is subject to hydraulic control concurrently with unit 38.

The traction motors 36 and 40 are capable of driving the wheels 24 and 26 at various speeds controlled by an electrical speed command signal which is produced by the command unit 44, shown in FIG. 1. Command unit 44 may be a simple potentiometer (FIG. 3) connected to a throttle which is operable by the operator of the vehicle. The hydraulic brake units 38 and 40 are similarly selectively actuable by means of an electrohydraulic brake control unit 46 (FIG. 3) having hydraulic output lines 48 and 50 which are connected directly to the hydraulic brake units 38 and 40 for control purposes. The brake control unit 46 is responsive to an electrical input signal to apply hydraulic pressure to the brake units 38 and 42 which is proportional thereto.

The caliper arms 28 and 30 are mechanically interconnected by a control device in the form of an hydraulic actuator 52 having oppositely extending output rods 54 and 56 which are pivotally connected to the caliper arms 28 and 30 at pivots 58 and 60, respectively. The actuator 52 is controlled by an electrohydraulic traction control unit 62 (FIG. 3) having hydraulic output lines 64 and 66 which control the flow of hydraulic fluid to and from the actuator 52 in accordance with an electrical input signal. The traction control unit 62 through the hydraulic line 64 and 66 and the actuator 52 is operative to variably close the caliper arms 28 and 30 about the rail 14 thereby to apply a varying force load or pressure on the traction surfaces 16 and 18 through the wheels 24 and 26, respectively.

Looking now to FIG. 1, the control system of the illustrated embodiment includes a magnetic transducer including a small wheel 68 which bears lightly against the traction surface 18 of the rail 14. Wheel 68 carries a magnetic spot which coacts with a small coil 69 to produce low-level voltage pulses at a frequency which is determined by the speed of rotation of wheel 68. This rotational speed is determined by the actual speed of the vehicle chassis 10 relative to the fixed rail 14 and, thus, relative to the roadway 12. The pulses which are produced by the rotation of wheel 68 are transmitted to a frequency-responsive voltage generator 70 (FIG. 3) which produces an output signal related in amplitude to the frequency of the input pulses from wheel 68. At the same time, a signal quantity is generated at drive motor 40 which is proportional to the actual speed of rotation of the drive wheel 26 multiplied by the effective radius of the wheel to represent the lineal speed of the periphery of wheel 26 which engages the traction surface 18. This lineal speed indicating signal is normally unequal to the actual speed signal which is produced by unit 70, the difference being a function of the slip between wheel 26 and surface 18. The lineal speed signal is transmitted over a line 72 to the input of a drive wheel speed transducer 74 the output of which is a dc voltage which varies in amplitude in accordance with the input signal (FIG. 3). As will be apparent to those skilled in the art, various implementations for both the actual speed transducer and the lineal wheel speed transducer are available and the specific design is primarily a matter of choice.

The two variable amplitude dc signals representing actual vehicle speed and lineal wheel speeds are compared to one another in a slip computer unit 76 which includes a differential amplifier (FIG. 3) to determine the difference between the actual vehicle speed and the speed of wheel 26. This difference represents the slip between the wheel 26 and the traction surface 18 and after suitable weighting in accordance with the operating mode of the vehicle indicated by the speed command from unit 44, the difference signal is applied to the traction control unit 62 to regulate the load force imposed on the traction surfaces 16 and 18 by the drive wheels 24 and 26, respectively. Slip computer 76 may constitute a suitable operational amplifier adapted to compare the dc signal quantities from unit 70 and 74 and having a variable gain characteristic which is controlled by the setting of speed command unit 44. Other implementations of the slip computer 76 will be apparent to those skilled in the art.

The vehicle control system further includes a deceleration or brake system which is generally similar to the acceleration system except that the command signal operates on units 38 and 42. A brake command generator 78 produces dc signals which vary in amplitude in accordance with the desired braking effect of the operator. A pedal potentiometer or force transducer can provide such a signal as schematically illustrated in FIG. 3. This signal is applied to the brake control unit 46 to apply pressure to hydraulic lines 48 and 50. The signal is also applied to the slip computer 80 which is generally similar to computer 76. Computer 80 also functions to compare the lineal wheel speed signal from unit 70 and to produce a difference signal related to wheel slip as schematically illustrated in FIG. 3. This signal, weighted by the brake command in the manner described with reference to computer 76, is applied to the traction control unit 62 to adjust the load force between the wheels 24 and 26 and the rail 14. The greater the desired braking force, the greater the traction force to prevent slip from exceeding that value which produces the maximum braking force.

In operation, the vehicle chassis 10 is placed on the roadway 12 such that the drive wheels 24 and 26 engage the complementally opposite surfaces 16 and 18 of the upright rail 14, as shown in FIG. 2. The running gear represented in FIG. 2 by the air pads 20 and 22 is operated to support the vehicle relative to the roadway 12. To accelerate, the operator applies a suitable force or displacement to the speed command unit 44 to energize the drive motors 36 and 40 to rotate the wheels 24 and 26, respectively. During acceleration there is a significant tendency for the wheels 24 and 26 to slip relative to the traction surfaces 16 and 18 unless properly loaded against those surfaces. Accordingly, the lineal wheel speed signal applied over line 72 to the unit 74 and, thence, to the slip computer 76 may significantly exceed the actual speed signal which is produced by the rotation of wheel 68 against the traction surface 18 of rail 14. Under these conditions the slip computer 76 in the high gain condition established by the speed command 44 applies a signal to the traction unit 62 which causes retraction of the output rods 54 and 56 of the actuator 52. This tends to close the caliper arms 28 and 30 toward one another, thus, applying a high load force or pressure to the traction surfaces 16 and 18 through the wheels 24 and 26, respectively. Since the compression force which can be applied by the actuator 52 against the vertical rail surfaces 16 and 18 is not limited by the weight of the vehicle, an extremely high compression load can be applied to the rail 14 and, accordingly, a high acceleration characteristic may be generated.

Once cruising speed has been attained, the actual speed signal produced by unit 70 more nearly equals the lineal wheel speed signal produced by drive wheel speed unit 74 and the output of the slip computer 76 is reduced to a low level. Under such conditions unnecessary wear and heat develops from having the wheels 24 and 26 highly loaded against the traction surfaces 16 and 18. Accordingly, the traction control unit 62 responds to the reduced input signal to slightly extend the output rods 54 and 56 of the actuator 52 and reduce the loading of the wheels 24 and 26 against the rail 14. The loading is preferably reduced to the point where the slip is minimized and maximum propulsion efficiency results.

When decelerating the vehicle, the brake command unit 78 generates an electrical output signal proportional to the desired braking effect. This signal is applied to the brake control unit 46 and to the slip computer 80 to vary the gain of the amplifier comparing the wheel and vehicle speed signals. Accordingly, the slip computer 80 produces an output signal which is applied to the traction control unit 62 to apply a predetermined pressure to the traction surfaces 16 and 18.

It will be understood that various modifications may be made to the system shown in FIGS. 1 and 2. For example, the traction surfaces 16 and 18 may be represented by complemental surfaces which are established outboard of the wheels 24 and 26 rather than by a central rail. In such case, the single actuator 52 may be operated in a reverse direction or, alternatively, a pair of hydraulic actuators may be employed one for each wheel. Various other modifications in mechanical fabrication and control system design will also be apparent to those skilled in the art.

The embodiments of the invention in which an exclusive property or privilege is claimed are defined as follows:

1. A vehicle propulsion system comprising: a roadway having a fixed traction surface coextensive therewith; a vehicle; support means supporting the vehicle for movement along the roadway; a driving wheel mounted on the vehicle and engageable with the traction surface to provide propulsion for the vehicle along the roadway irrespective of the inclination of the roadway, said driving wheel being independent of said support means; vehicle speed measuring means on the vehicle for measuring the speed of the vehicle relative to the traction surface as the vehicle travels along the roadway; driving wheel speed measuring means connected with said driving wheel for measuring the lineal speed of the periphery of the driving wheel; a control device connected to said driving wheel for varying the pressure of the driving wheel on the traction surface; and traction control means connected with said control device and responsive to said vehicle speed measuring means and driving wheel speed measuring means to actuate said control device to vary the pressure of the driving wheel on the traction surface when the driving wheel is rotating at a speed other than a speed corresponding to the speed of the vehicle along the roadway to adjust the speed of the driving wheel to a speed corresponding to the linear speed of the vehicle.

2. A system as claimed in claim 1 wherein said vehicle speed measuring means comprises a first transducer for producing a first signal proportional to the speed of the vehicle relative to the traction surface, and said driving wheel speed measuring means comprises a second transducer for producing a second signal proportional to the lineal speed of the driving wheel, and further including computer means for determining the difference between the first and second signals for controlling said traction control means.

3. A system as claimed in claim 2 wherein said first transducer includes a wheel engaging said traction surface for rotation in response to linear movement of the vehicle.

4. A system as claimed in claim 1 wherein the traction surface is defined by a vertical face of a fixed roadway member.

5. A system as claimed in claim 4 wherein said driving wheel is mounted on the vehicle for rotation about a substantially vertical axis, said control device being operable to apply a variable force to the wheel urging the wheel into the vertical face of the roadway member.

6. A vehicle propulsion system comprising: a roadway having a pair of upright, fixed traction surfaces coextensive therewith; a vehicle; support means supporting the vehicle for movement along the roadway; a pair of driving wheels mounted on the vehicle each engageable with one of the traction surfaces to provide propulsion for the vehicle along the roadway irrespective of the inclination of the roadway, said driving wheels being independent of said support means; vehicle speed measuring means on the vehicle for measuring the speed of the vehicle relative to the roadway as the vehicle travels along the roadway; driving wheel speed measuring means connected with at least one of said driving wheels for measuring the lineal speed of the periphery of said one driving wheel; a control device connected to said driving wheels for varying the pressure of the driving wheels on the traction surfaces; and traction control means connected with said control device and responsive to said vehicle speed measuring means and driving wheel speed measuring means to actuate said control device to vary the pressure of the driving wheels on the traction surface when the driving wheels are rotating at a speed other than a speed corresponding to the speed of the vehicle along the roadway to adjust the speed of the driving wheels to a speed corresponding to the linear speed of the vehicle.

7. A system as claimed in claim 6 wherein the traction surfaces are defined by the opposite vertical faces of a fixed rail.

8. A system as claimed in claim 7 wherein the driving wheels are mounted for rotation about vertical axes.

9. A system as claimed in claim 8 including a pair of caliper arms pivotally mounted on the vehicle and supporting the driving wheels, the control device being connected between the caliper arms to selectively open and close the arms relative to said rail.

10. A system as claimed in claim 9 wherein said control device includes an hydraulic actuator.

11. A system as claimed in claim 6 including means for applying braking forces to said driving wheels.

12. A system as claimed in claim 11 wherein said vehicle speed measuring means comprises a first transducer for producing a first signal proportional to the speed of the vehicle relative to the traction surface, and said driving wheel speed measuring means comprises a second transducer for producing a second signal proportional to the lineal speed of the driving wheel, and further including computer means for determining the difference between the first and second signals for controlling said traction control means.

13. A system as claimed in claim 12 wherein said first transducer includes a wheel engaging one of the traction surfaces for rotation in response to linear movement of the vehicle.

* * * * *